(No Model.)
A. F. BARDWELL.
GUIDE FOR TROLLEY ARMS.
No. 439,092. Patented Oct. 28, 1890.
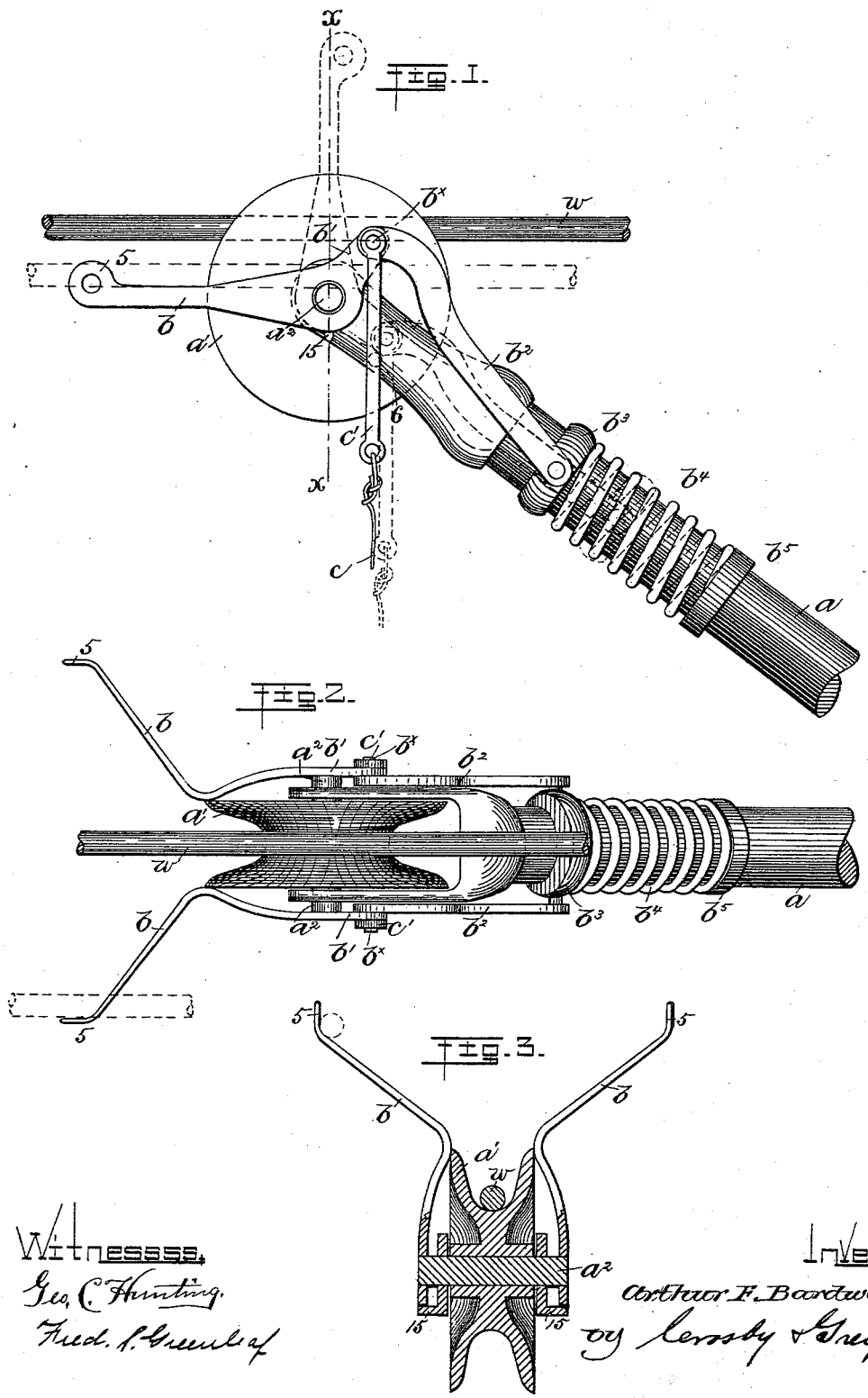

UNITED STATES PATENT OFFICE.

ARTHUR F. BARDWELL, OF BOSTON, ASSIGNOR OF ONE-HALF TO HERBERT H. BROOKS, OF CAMBRIDGE, MASSACHUSETTS.

GUIDE FOR TROLLEY-ARMS.

SPECIFICATION forming part of Letters Patent No. 439,092, dated October 28, 1890.

Application filed May 15, 1890. Serial No. 351,936. (No model.)

*To all whom it may concern:*

Be it known that I, ARTHUR F. BARDWELL, of Boston, county of Suffolk, State of Massachusetts, have invented an Improvement in Guides for Trolley-Arms, of which the following description, in connection with the accompanying drawings, is a specification, like letters and figures on the drawings representing like parts.

This invention has for its object to provide a trolley-arm with a suitable device to restrain the arm from flying into the air when the trolley-wheel jumps from the trolley-wire, the device also serving as a guide to assist in replacing the trolley-wheel upon the wire.

In accordance with this invention outwardly-extended flaring-arms are pivoted one at each side of the trolley-wheel, said arms being normally held in a horizontal position by the action of a spring, so that they will catch on the trolley-wire when the wheel leaves it, and thus prevent the arm from flying into the air, the said arms having at their outer ends upwardly-extended projections which prevent the trolley-wire from sliding off the said arms. To replace the trolley upon the wire, the flaring arms are brought into a vertical position by a suitable cord provided for that purpose, carrying the wire down their inclined faces into the trolley, as will be described.

Therefore one part of my invention consists in the combination, with a trolley-arm and a trolley-wheel carried thereby, of pivoted flaring arms having projections, and a spring to normally keep said arms in a horizontal position, substantially as will be described.

Other features of my invention will be hereinafter pointed out in the claims at the end of this specification.

Figure 1 of the drawings shows a trolley-wheel and a sufficient portion of a trolley-arm to enable my invention to be understood; Fig. 2, a top or plan view of Fig. 1; and Fig. 3, a section taken on the dotted line $x$ $x$, Fig. 1, with the arms in their vertical position.

Referring to the drawings, the trolley-arm $a$, forked to receive the trolley-wheel $a'$, journaled on the shaft $a^2$, may be of any well-known form or construction, the trolley-wheel being shown as bearing against a trolley-wire $w$.

The shaft $a^2$ has journaled upon it at either end outside the forked arm $a$ two guide-arms $b$, herein shown as having a preliminary bend inward toward the side of the trolley-wheel, and then inclining or flaring outwardly, as shown in Figs. 2 and 3, having at their outer ends upwardly-extended projections 5, to be referred to.

The flaring arms $b$, as represented, are provided with short arms $b'$, jointed at $b^\times$ to the links $b^2$, said links at their opposite ends being pivoted to opposite sides of a sleeve or collar $b^3$, adapted to slide on the trolley-arm $a$ and acted upon by a spring $b^4$, encircling said arm and bearing at its opposite end against a fixed shoulder $b^5$. (See Figs. 1 and 2.) The spring $b^4$ acts to keep the flaring arms $b$ in a horizontal position, as shown in Figs. 1 and 2, bearing against the stops 15 on the trolley-arm, the links $b^2$ then assuming an inclined position from the trolley-arm to the periphery of the trolley, as shown in Fig. 1, so that if the trolley leaves the wire the span-wires will not be caught between the periphery of the wheel and the trolley-arm and broken, which is often the case in trolley-arms as now constructed, but will be warded off up the inclined links $b^2$ and will pass over the trolley unharmed. With the flaring arms $b$ in their normal positions, as in Figs. 1 and 2, if the trolley-wheel should jump from the wire on either side the flaring-arm $b$ on that side will arrest the upward movement of the trolley-arm by catching on the trolley-wire, the projection 5 keeping the wire on the arm, as shown in dotted lines, Figs. 1 and 2, making it possible for the car to move any distance without doing damage, the arm $b$ traveling in contact with the trolley-wire, conducting the current therefrom to the car precisely as if the trolley itself were upon the wire. To replace the trolley-wheel upon the wire, the arms $b$ are thrown into a vertical position, as shown in dotted lines, Fig. 1, by means of a cord $c$ attached to a yoke $c'$, jointed to the pivot $b^\times$, (see Figs. 1 and 2,) compressing the spring $b^4$, the trolley-wire being lifted by the arm on which it rests, as shown by dotted lines, Fig. 3, when it will readily slide down on the inclined arm into the trolley-wheel, the arms $b$ being returned to their horizontal positions by the spring $b^4$. A stop 6 is provided to limit the downward movement of the links $b^2$. When the trolley-arm is drawn down away from the wire by the cord $c$ to permit turning or reversing the same, the arms $b$ are automatically thrown into a vertical position, thus presenting a substantially vertical wide flaring entrance or guide to the trolley-wheel, making it easy to replace the same upon the wire, the said arms guiding the wire into the wheel; but when the arms $b$ are in their normal position, which is the position occupied when the car is moving, they are substantially parallel to and preferably below the longitudinal center line of the trolley-wire, so that they are out of the way of and will pass freely under any span-wire or obstruction upon the trolley-wire without striking the same.

I do not limit myself to the particular form or construction of the various parts shown, as it is obvious that the same may be varied without departing from the scope of this invention.

I hereby disclaim, broadly, a shipper device for trolleys, consisting of two diverging pivoted arms, one on either side of the said trolley and extending outwardly from either face thereof, said arms projecting normally when the trolley is in contact with the wire below the said wire and below any portions of the overhead construction adjacent thereto.

I claim—

1. The combination, with a trolley-arm and a trolley-wheel carried thereby, of the pivoted flaring arms $b$, having projections 5 to prevent the said arms from leaving the conductor when the trolley-wheel has been displaced, and a spring to normally keep said arms in a horizontal position, substantially as described.

2. The combination, with a trolley-arm and a trolley-wheel carried thereby, of the pivoted flaring arms $b$, links $b^2$, and spring $b^4$, to operate substantially as described.

3. The combination, with a trolley-arm and a trolley-wheel carried thereby, of the pivoted arms $b$ and links $b^2$ to present inclined faces from the trolley-arm to said trolley-wheel, substantially as described.

4. The combination, with a trolley-arm and a trolley-wheel carried thereby, of the pivoted flaring arms $b$, links $b^2$, spring $b^4$, and the cord $c$, to operate substantially as described.

5. The combination, with a conductor and a traveling contact therefor, of the pivoted flaring arms $b$ to conduct the current from said wire upon displacement of said traveling contact, substantially as described.

6. The combination, with a trolley-arm and a trolley-wheel carried thereby, of the pivoted flaring arms $b$, having projections 5, a spring to keep said arms in normal position, and the stop 15, to operate substantially as described.

7. The combination, with a trolley-arm and a trolley-wheel carried thereby, of two arms $b$, pivoted one at either side of the said trolley-wheel, the fork $c'$, and cord $c$, to operate substantially as described.

In testimony whereof I have signed my name to this specification in the presence of two subscribing witnesses.

ARTHUR F. BARDWELL.

Witnesses:
JAMES H. CHURCHILL,
EMMA J. BENNETT.